United States Patent
Kedem et al.

(10) Patent No.: US 8,958,302 B2
(45) Date of Patent: Feb. 17, 2015

(54) APPARATUS, SYSTEM AND METHOD OF CONTROLLING DATA FLOW OVER A WIRELESS COMMUNICATION LINK WITH CREDIT ALLOCATION

(71) Applicant: Intel Corporation, Santa Clara, CA (US)

(72) Inventors: Oren Kedem, Modiin Maccabim-Reut (IL); Bahareh Sadeghi, Portland, OR (US); Michael Glik, Kfar Saba (IL); Elad Levy, Rishon LeZion (IL); Ophir Edlis, Modiin (IL)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 13/693,745

(22) Filed: Dec. 4, 2012

(65) Prior Publication Data

US 2014/0153394 A1    Jun. 5, 2014

(51) Int. Cl.
*H04L 1/00* (2006.01)
*H04W 4/00* (2009.01)
*H04L 12/28* (2006.01)
*G06F 15/16* (2006.01)
*H04W 28/10* (2009.01)

(52) U.S. Cl.
CPC .................................... *H04W 28/10* (2013.01)
USPC ........... 370/235; 370/328; 370/412; 370/419; 709/232

(58) Field of Classification Search
USPC ............ 370/229–239, 310–350, 392–395.21, 370/400–406, 412–429; 709/223–226, 709/231–244, 250, 253
See application file for complete search history.

(56) References Cited

U.S. PATENT DOCUMENTS

| | | | |
|---|---|---|---|
| 7,536,473 B2 * | 5/2009 | Ajanovic et al. | 709/234 |
| 7,623,459 B2 * | 11/2009 | Yang et al. | 370/235 |
| 7,773,514 B2 * | 8/2010 | Kaminski et al. | 370/230.1 |
| 7,827,325 B2 * | 11/2010 | Adar et al. | 710/29 |
| 7,924,708 B2 * | 4/2011 | Spink | 370/229 |
| 8,400,973 B2 * | 3/2013 | Lundh et al. | 370/329 |
| 8,593,953 B2 * | 11/2013 | Marbach et al. | 370/230 |
| 8,638,686 B2 * | 1/2014 | Shihada et al. | 370/252 |
| 2005/0053034 A1 | 3/2005 | Chiueh | |

(Continued)

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.

(Continued)

*Primary Examiner* — Tri H Phan
(74) *Attorney, Agent, or Firm* — Shichrur & Co.

(57) ABSTRACT

Some demonstrative embodiments include apparatuses, systems and/or methods of controlling data flow over a wireless communication link with credit allocation. For example, an apparatus may include controller to control a data flow of a stream of data from a first device to a second device over a wireless communication link, the stream of data including data to be delivered to a plurality of endpoints, wherein the controller is to provide to the first device a plurality of credit allocations corresponding to the plurality of endpoints, wherein the controller is to determine a particular credit allocation corresponding to a particular end point based at least on an estimated link delay of the wireless communication link, and an estimated delivery rate of delivering data from a buffer of the second device to the particular endpoint.

30 Claims, 4 Drawing Sheets

(56) References Cited

U.S. PATENT DOCUMENTS

| | | | |
|---|---|---|---|
| 2005/0135243 A1 | 6/2005 | Lee et al. | |
| 2005/0249114 A1* | 11/2005 | Mangin et al. | 370/229 |
| 2006/0146875 A1* | 7/2006 | Yang | 370/468 |
| 2006/0198301 A1* | 9/2006 | Airy et al. | 370/229 |
| 2007/0076610 A1 | 4/2007 | Yang et al. | |
| 2007/0127378 A1 | 6/2007 | Yang et al. | |
| 2009/0290491 A1* | 11/2009 | Karagiannis et al. | 370/235 |
| 2011/0235630 A1 | 9/2011 | Hui et al. | |
| 2014/0140258 A1* | 5/2014 | Sadeghi et al. | 370/312 |

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012.

Wi-Fi Alliance Technical Committee P2P Task Group. Wi-Fi Peer-to-Peer (P2P) Technical Specification. Version 1.2; Dec. 14, 2011; 160 pages.

Universal Serial Bus Mass Storage Class—Bulk-Only Transport, Revision 1.0, Sep. 31, 1999; 22 pages.

Universal Serial Bus Specification, Revision 2.0; Apr. 27, 2000.

Universal Serial Bus 3.0 Specification (including errata and ECNs through May 1, 2011); Revision 1.0; Jun. 6, 2011.

International Search Report and Written Opinion for PCT Patent Application No. PCT/US2013/048059, mailed on Oct. 22, 2013, 13 pages.

\* cited by examiner

APPARATUS, SYSTEM AND METHOD OF CONTROLLING DATA FLOW OVER A WIRELESS COMMUNICATION LINK WITH CREDIT ALLOCATION

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version 1.1, April* 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer.

The WSE defines a WSE host ("host") controller communicating with a WSE device over a WiGig wireless link interface. The host can connect and control several WSE devices. Each WSE device can connect several USB ports, and each USB port can be attached to a USB device or be extended to several ports via a USB hub.

The WSE device typically includes a buffer for buffering data received from the host to be delivered to USB devices connected to the WSE device. The size of the buffer may affect a throughput and/or latency of the data flow between the host and the USB devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing WiGig Serial Extension (WSE) protocols (*WiGig Serial Extension (WSE) Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, *Sep.* 31, 1999) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012*; IEEE802.11 task group ac (TGac) ("*IEEE802.11-09/0308r12—TGac Channel Model Addendum Document*"); IEEE 802.11 task group ad (TGad) (*IEEE P802.11ad/D9.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*)), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to device communication.

A WSE device may include, for example, a WSE architectural element that integrates at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. In one example, the integrated device may be presented through the WSE device to the host as a USB device compliant with a USB specification, e.g., the USB 2.0 and/or USB 3.0 Specifications.

A WSE host may include an architectural element of the WSE PAL that includes a wireless communication architecture, e.g., a WiGig MAC and PHY, and USB host logic, e.g., as defined by the USB Specification.

An endpoint may include, for example, an architectural element, which is associated with a first device, which in turn is configured to interface between the endpoint and a second device over a wireless communication link. For example, the endpoint may be integrated as part of the first device or connected to the first device via one or more other devices and/or connections. The endpoint may be implemented, for example, using any technology, e.g., software, hardware and/ or any combination thereof. The first device may include and/or interface between one or more endpoints and the second device. In one example, the first device may include a WSE device and the second device may include a WSE host. For example, the endpoint may belong to a USB device, e.g., a USB device, which may be integrated into the WSE device or connected, e.g., through a wired USB connection, to the WSE device, e.g., via a hub integrated into the WSE device. According to this example, the endpoint may be uniquely identified by the WSE host. For example, a combination of a WSE device address of the WSE device and a WSE EP handle assigned to the endpoint may uniquely identify a USB device endpoint within a WSE service set. In other examples, the first and second devices may include any other, e.g., non-WSE and/or non-USB, device and the endpoint may perform the functionality of any other, e.g., non-USB and/or non-WSE, element.

Figure 1:
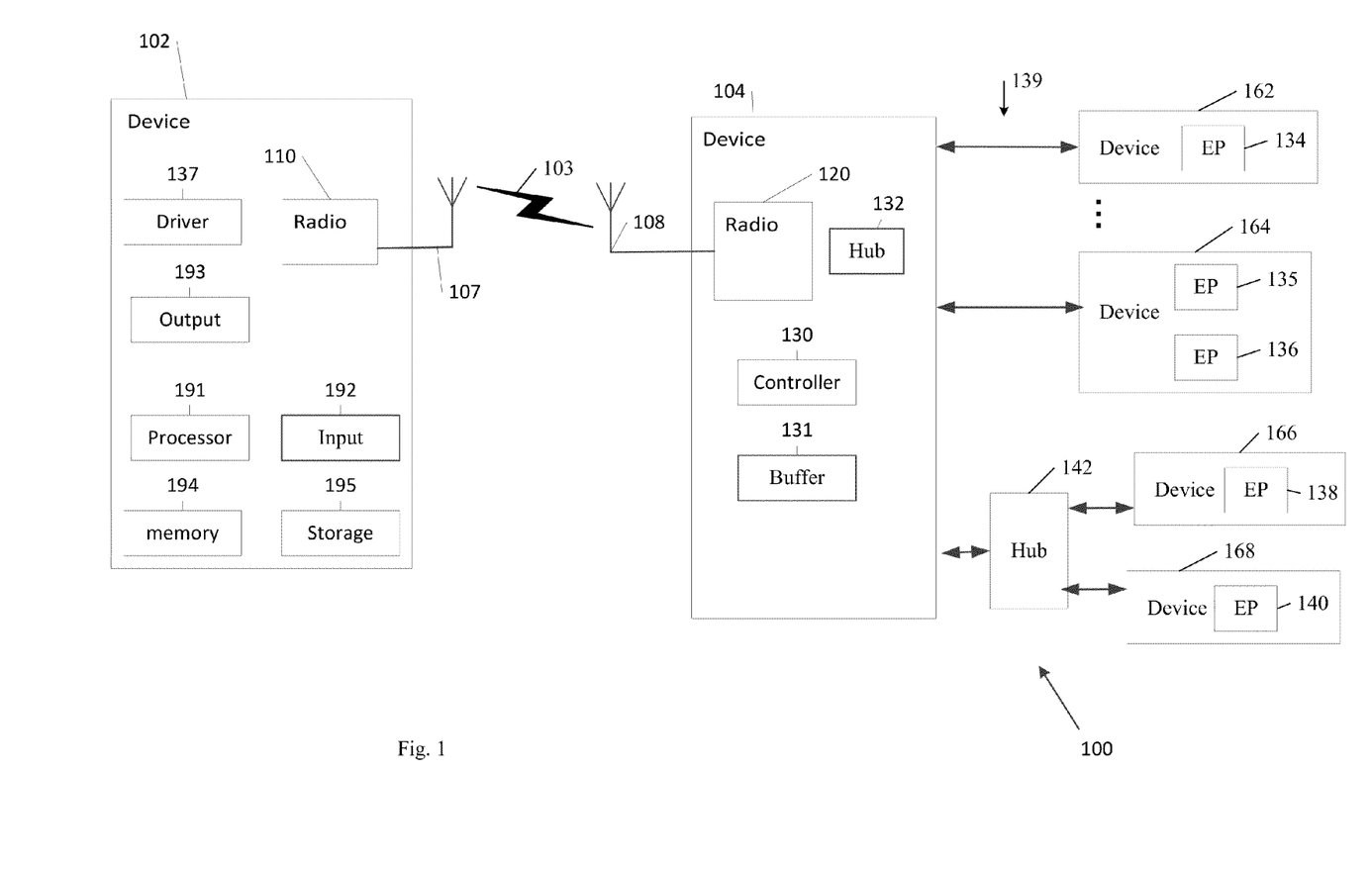
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 104, capable of communicating content, data, information and/or signals over a wireless communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, a notebook computer, a tablet computer, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 104 may include radios 110 and 120, respectively, to perform wireless communication between wireless communication devices 102 and 104 and/or with one or more other wireless communication devices, e.g., as described below.

Wireless communication devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT)

display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

In some demonstrative embodiments, radios 110 and/or 120 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 110 and/or 120 may include one or more wireless transmitters, receivers and/or transceivers able to send and/or receive wireless communication signals, RF signals, frames, blocks, transmission streams, packets, messages, data items, and/or data. For example, radios 110 and/or 120 may include or may be implemented as part of a wireless Network Interface Card (NIC), and the like.

In some demonstrative embodiments, wireless communication devices 102 and 104 may establish a wireless communication link 103. Wireless communication link 103 may include an uplink and/or a downlink. For example, the uplink may include a link for communicating data from device 104 to device 102, and/or the downlink may include a link for communicating data from device 102 to device 104. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and 104 may form, or may be part of, a wireless communication network. The wireless communication network may include, for example, a P2P network or any other network.

In some demonstrative embodiments, wireless communication devices 102 and/or 104 may perform the functionality of DMG stations ("DMG STA"). For example, wireless communication devices 102 and/or 130 may be configured to communicate over the DMG band.

In some demonstrative embodiments, device 102 may include a mobile device and device 104 may include a docking device to connect device 102 to one or more other devices ("peripherals"), for example, including one or more USB devices, e.g., devices 162, 164, 166 and/or 168, and/or any other device.

For example, device 102 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more End points (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, a wireless communication data rate of link 103, which may be utilized for communication between devices 102 and 104, may be different from and/or not synchronized with, the data rate supported by the USB interfaces 139, which may be utilized for USB communication between device 104 and EPs 134, 135, 136, 138 and/or 140.

In some demonstrative embodiments, device 104 may include a buffer 131, which may be configured to buffer data communicated between device 102 and EPs 134, 135, 136, 138 and/or 140. For example, buffer 131 may buffer data received from device 102 over link 103 and intended for a particular endpoint of EPs 134, 135, 136, 138 and/or 140, e.g., until the data is successfully transferred from device 104 to the particular endpoint.

In some demonstrative embodiments, devices 102 and 104 may communicate over link 103 according to a WiGig protocol.

In one example, device 102 and 104 may communicate over link 103 according to the WSE Protocol Abstraction Layer (PAL). For example, device 102 may perform the functionality of a WSE host ("host") and device 104 may perform the functionality of a WSE device.

In other embodiments, device 102 and/or device 104 may perform the functionality of any other device implementing any other technology and/or protocol, e.g., other than WSE and/or USB.

In some demonstrative embodiments, devices 102 and 104 may communicate USB traffic over the WSE PAL of link 103. The USB traffic may include, for example, non-periodic (NP) traffic, e.g., bulk and/or control traffic, and/or periodic traffic, e.g., Isochronous and/or Interrupt traffic, which may be communicated by the EPs of the USB tree.

In some demonstrative embodiments, the periodic traffic may be required to be conducted under a certain bandwidth (BW) and latency Service Level Agreement (SLA), while the NP traffic may be communicated according to a best-effort (BE), potentially "greedy", scheme, which may be less sensitive to latency. There may also be some, e.g., low, BW requirements for management and/or control traffic of the WSE PAL.

In some demonstrative embodiments, the USB traffic may include traffic ("IN EP") delivered from EPs 134, 135, 136, 138 and/or 140 to device 104, and/or traffic ("OUT EP") delivered from device 104 to EPs 134, 135, 136, 138 and/or 140.

In some demonstrative embodiments, all data transfers ("transactions") between device 104 and EPs 134, 135, 136, 138 and/or 140 may be initiated by a WSE host, e.g., by device 102. For example, device 102 may include at least one driver 137, e.g., a USB device driver, configured to manage the transactions between device 102 and EPs 134, 135, 136, 138 and/or 140, e.g., via device 104. The host may initiate a data transaction, e.g., after corresponding buffer space is allocated for the transaction.

In some demonstrative, driver 137 may trigger an IN EP transaction, e.g., a "read" transaction for reading data from an EP. For example, driver 137 may allocate a buffer in memory 194 to receive the data transferred from the EP.

In some demonstrative, driver 137 may trigger an OUT EP transaction, e.g., a "write" transaction for writing data from device 102 to an EP. For example, driver 137 may send the data to device 104, e.g., over link, device 104 may buffer the data in buffer 131, and may transfer the data to the EP.

Some demonstrative embodiments are described herein with reference to communicating a data stream including USB data over a wireless communication link according to a WSE protocol. However, other embodiments may be implemented with respect to communicating any other suitable data over any other wireless communication link, according to any other wireless communication protocol and/or over any other layer or PAL.

In some demonstrative embodiments, device 104 may include a controller 130 configured to control a data flow of a stream of data from 102 to device 104 over wireless communication link 103. The stream of data may include data to be delivered to endpoints 134, 135, 136, 138 and/or 140.

In some demonstrative embodiments, controller 130 may utilize a credit allocation mechanism to allocate buffer 131 for buffering data to be delivered to endpoints 134, 135, 136, 138 and/or 140. For example, controller 130 may allocate to device 102 a plurality of credit allocations ("credits") corresponding to a plurality of endpoint intended to receive data from device 102 via link 103. Device 102 may transmit the data stream to device 104 via link 103 according to the allocated credit, e.g., as described below.

The term "credit" as used herein may refer to any suitable indication of a permitted amount of data, which is permitted by a first device, for transferring data from a second device to the first device. The credit may include any suitable indication of the permitted amount of data. In one example, the credit may include a number of credit consumption units (CCUs), each CCU representing a predefined data size, for example, in terms of Kilobytes (Kb), e.g., 16 Kb. For example, controller 130 may allocate to device 102 credit for communicating data intended for a particular EP, e.g., by allocating to device 102 a number of CCUs representing an amount of data intended for the particular EP, which device 102 is permitted to communicate to device 104 over wireless communication link 103.

In some demonstrative embodiments, device 102 may send the OUT EP transaction data intended for a particular EP as part of one or more transfer request ("TransferReq" or "T.req") messages transmitted from device 102 to device 104 over wireless communication link 103. For example, the OUT EP transaction data may be fragmented into a plurality of data blocks to be transmitted as part of a respective plurality of transfer request messages. A transfer request message may include, for example, a data block of the OUT EP transaction data, an EP identifier (ID) identifying the EP intended to receive the data block, and a Request identifier (RequestID) identifying the data block, e.g., in relation to one or more other data blocks of the OUT EP transaction data. The transfer request message may also include an indication (RemSize) of remaining data size of the OUT EP transaction data to be transmitted as part of one or more subsequent transfer request messages. In other embodiments, the transfer request message may have any other structure and/or may include any other alternative and/or additional information.

In some demonstrative embodiments, device 104 may send to device 102 a transfer response message ("TransferResp" or "T.Rsp") in response to a transfer request message. The transfer response message may include an indication of the credit allocated to the particular EP.

In some demonstrative embodiments, wireless communication link 103 may introduce a relatively large round trip link delay. This link delay may result in device 102 receiving from device 104 a credit allocation, which may be inaccurate and/or may not truly reflect an actual status of buffer 131. For example, by the time device 102 receives the allocated credit, endpoints 134, 135, 136, 138 and/or 140 may have already drawn at least part of the data buffered in buffer 131, thereby clearing additional buffer space in buffer 131. This additional buffer space is cleared after the credit was allocated to device 102 and, accordingly the credit allocation received by device 102 may not reflect the additional buffer space.

In some demonstrative embodiments, the buffer size of buffer 131 may be limited, expensive and/or relatively small. Accordingly, efficient utilization of buffer 131 may enable increasing a throughput of the data flow over link 103, increasing a throughput of the data flow between device 102 and endpoints 134, 135, 136, 138 and/or 140, reducing a latency of the data flow between device 102 and endpoints 134, 135, 136, 138 and/or 140, and/or reducing a production cost of device 104.

In one example, device 102 may be required to defer transmission of data to device 104 over wireless communication link 103, e.g., if a size of the data to be transmitted is greater than an allocated credit corresponding to a particular endpoint intended to receive the data. Increasing the utilization efficiency of buffer 131 may enable allocating greater credit to the particular endpoint and, accordingly, may reduce a latency of transferring the data from device 102 to the particular endpoint.

In some demonstrative embodiments, controller 130 may be configured to allocate buffer 131 for buffering data for endpoints 134, 135, 136, 138 and/or 140 based on an allocation mechanism, which is configured to compensate the link delay of link 103 and/or to achieve high throughput to endpoints 134, 135, 136, 138 and/or 140, e.g., while obviating an increase in the size of buffer 131.

In some demonstrative embodiments, controller 130 may be configured to allocate buffer 131 for buffering data for endpoints 134, 135, 136, 138 and/or 140, while considering a wireless link delay of wireless communication link 103, e.g., as described in detail below.

In some demonstrative embodiments, controller 130 may determine a particular credit allocation corresponding to a particular end point of EPs 134, 135, 136, 138 and 140 based an estimated delivery rate ("draining rate") of delivering data from buffer 131 to the particular endpoint, e.g., as described in detail below.

In some demonstrative embodiments, controller 130 may determine the particular credit allocation corresponding to the particular end point of EPs 134, 135, 136, 138 and 140 based at least on the estimated link delay of wireless communication link 103 and the estimated delivery rate of delivering data from buffer 131 to the particular endpoint, e.g., as described in detail below.

In some demonstrative embodiments, device 104 may receive from device 102 a transfer request indicating a remaining data size of data for the particular endpoint to be transferred over wireless communication link 103.

In some demonstrative embodiments, controller 130 may determine the particular credit allocation based on the remaining data size, e.g., as described below. Device 104 may transmit to device 102 a transfer response including the particular data allocation.

In some demonstrative embodiments, controller 130 may determine the particular credit allocation based on the estimated link delay and the estimated delivery rate, for example, when the remaining data size is greater than a free portion of buffer 131, e.g., as described below.

In some demonstrative embodiments, controller 130 may allocate to the particular endpoint an increased amount of credit responsive to an increase in the link delay of wireless communication link 103 and/or in response to an increase in the estimated delivery rate to the particular endpoint, e.g., as described below.

In some demonstrative embodiments, controller 130 may determine the particular credit allocation to include a first credit allocation, in response to the estimated link delay including a first link delay, and to determine the particular credit allocation to include a second credit allocation, greater than the first credit allocation, in response to the estimated link delay including a second link delay, e.g., greater than the first link delay.

In some demonstrative embodiments, controller 130 may determine the particular credit allocation to include a first credit allocation, in response to the estimated delivery rate including a first delivery rate, and to determine the particular credit allocation to include a second credit allocation, greater than the first credit allocation, in response to the estimated delivery rate including a second delivery rate, greater than the first delivery rate.

In some demonstrative embodiments, controller 130 may determine the estimated link delay of wireless communication link 130 based on an estimated time period for device 102 to utilize credit, which was allocated by controller 130.

In some demonstrative embodiments, controller 130 may determine the estimated link delay of link 130 based on a first time at which the particular credit allocation is communicated to device 102, and a second time at which device 104 receives from device 102 data communicated utilizing the particular credit allocation.

For example, controller 130 may determine the estimated link delay of link 103 based on a difference between a first time at which device 104 transmits to device 102, e.g., in response to a first transfer request, a transfer response which includes the particular credit allocation, and a second time, subsequent to the first time, at which device 104 receives from device 102 a second, subsequent, transfer request, which indicates that the particular credit allocation is utilized by device 102.

In one example, device 104 may receive from device 102, at a time, denoted t1, a first transfer request indicating a first remaining size, e.g., 16 Kb, of data to be transmitted to a particular endpoint. Device 104 may transmit to device 102, at a time, denoted t2, a transfer response including a credit allocated to the particular endpoint. Device 104 may receive from device 102, at a time, denoted t3, a second transfer request indicating a second remaining size, e.g., 0 Kb, of data to be transmitted to the particular endpoint. The second remaining size may indicate that device 102 had utilized the credit allocation allocated to the particular device by the transfer request. Accordingly, controller 130 may determine the link delay based on a difference between the times t3 and t2.

In some demonstrative embodiments, controller 130 may determine the estimated delivery rate corresponding to the particular endpoint, for example, based on a difference between a time at which data intended for the particular endpoint is buffered in buffer 131 and a time at which the data is delivered from buffer 131 to the particular endpoint.

For example, controller 130 may determine the estimated delivery rate corresponding to the particular endpoint based on an average time for clearing from buffer 131 data intended for the particular endpoint.

In some demonstrative embodiments, controller 130 may be configured to support a plurality of EPs, e.g., EPs 134, 136 138 and/or 140, e.g., concurrently, for example, by allocating credit corresponding to the plurality of EPs, e.g., to enable communicating data between device 104 and EPs 134, 136 138 and/or 140, e.g., concurrently.

In some demonstrative embodiments, controller 130 may determine the particular credit allocation corresponding to the particular endpoint based on information relating to one or more endpoints ("active endpoints"), which are in the process of, or intended to be in the process of, a transaction for receiving data from device 102 via device 104.

In some demonstrative embodiments, controller 130 may determine the particular credit allocation corresponding to the particular endpoint based on remaining sizes of data for the one or more other endpoints to be transmitted over wireless communication link 103. For example, controller 130 may determine the particular credit allocation corresponding to the particular endpoint based on the remaining sizes of data indicated by one or more transfer requests corresponding to the one or more other endpoints, e.g., as described below.

In some demonstrative embodiments, controller 130 may determine the particular credit allocation corresponding to the particular endpoint based on a relationship between a remaining size of data for the particular endpoint to be transmitted over wireless communication link 103, for example, as indicated by a transfer request corresponding to the particular endpoint, and a sum of the remaining sizes of data for the one or more other endpoints to be transmitted over wireless communication link 103, for example, as indicated by the one or more transfer requests corresponding to the one or more other endpoints, e.g., a described below.

In some demonstrative embodiments, controller 130 may be configured to allocate an initial buffer size of buffer 131 for each EP. The initial buffer size corresponding to an EP may include, for example, a predefined minimal buffer size of buffer 131, which may enable device 102 to initiate a transfer request for transferring data to the EP. The initial buffer size allocated to the EP may be determined, for example, according characteristics of the data intended to be transferred to the EP, for example, a latency, a throughput, data size, and the like.

In some demonstrative embodiments, controller 130 may maintain a remaining buffer size of buffer 131, e.g., after allocating the initial buffer sizes to the EPs, e.g., as a collective buffer "pool" ("active transfer buffer") to be dynamically allocated between the EPs, e.g., as described below.

In some demonstrative embodiments, controller 130 may allocate buffer 131, e.g., the active transfer buffer, to a particular EP, e.g., upon receiving from device 102 a transfer request for communicating data to the particular endpoint.

In some demonstrative embodiments, controller 130 may allocate buffer 131 to the particular EP based on a remaining data size of data for the particular endpoint to be transferred over wireless communication link 103, e.g., as indicated by a Transfer Request Remaining Size filed of the transfer request, the estimated link delay of wireless communication link 103, the estimated draining rate of buffer 131 with respect to the particular EP, and/or information corresponding to one or more other active EPs being served via link 103, e.g., as described below.

In some demonstrative embodiments, controller 130 may be configured to allocate the credit to device 102 to effectively utilize wireless communication link 103 for USB data traffic, e.g., such that an increased, e.g., a maximum, throughput may be attained.

In some demonstrative embodiments, controller 130 may be configured to allocate the credit to device 102 with respect to a particular EP, for example, such that device 102 may have enough credit allocated to allow device 102 to transmit data to the particular EP at a particular time, e.g., at any time, for example, without causing device 102 to wait to transmit the data, e.g., due to lack of credit.

In some demonstrative embodiments, controller 130 may allocate credit corresponding to most of, or even all of, the active transfer buffer, for example, to a single active transfer corresponding to an EP, e.g., if there are no other active transfers corresponding to other EPs. The increased credit allocation may enable an increased throughput of the single active transfer.

In some demonstrative embodiments, e.g., if a plurality of EP transfers are active, controller 130 may allocate the credit to the plurality of active transfers, for example, by dividing the active transfer buffer between the active transfers, e.g., as described below. Allocating the credit, while considering the link delay of link 103 and the draining rate of buffer 131, may enable allocating an increased amount of credit, e.g., since a data draining rate of the plurality of EPs may be greater compared to a draining rate of a single EP and, accordingly, a greater buffer size may be allocated, cleared and re-allocated.

Figure 2:
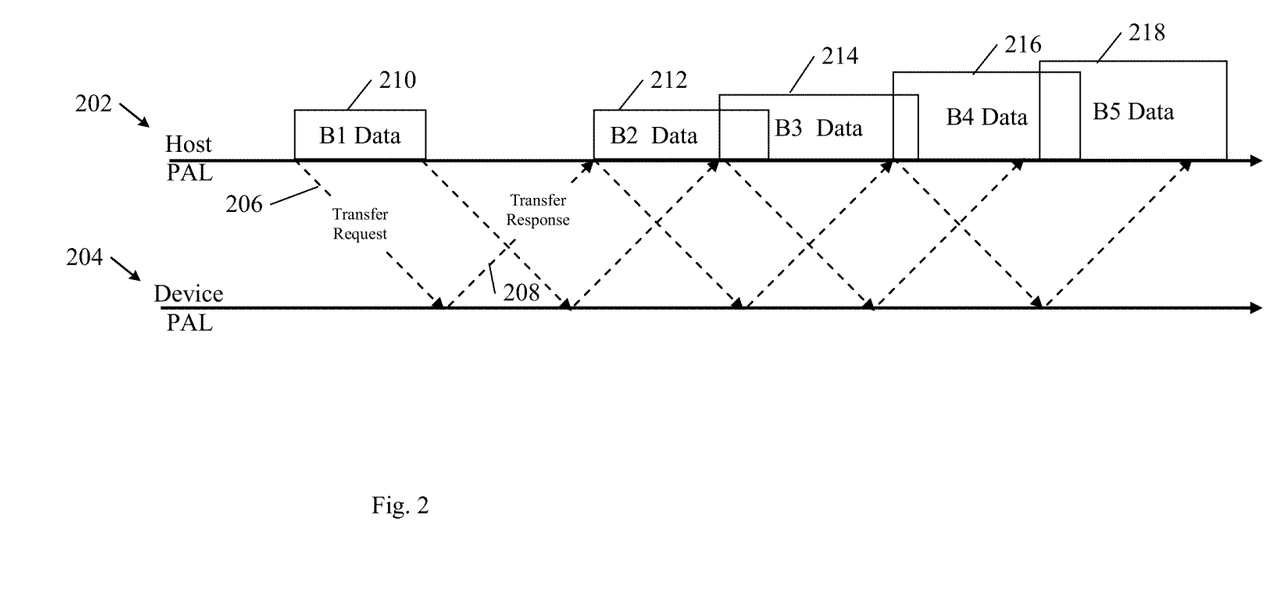
FIG. 2 is a schematic illustration of a sequence of communications exchanged between a host device and a Wireless Gigabit Serial Extension (WSE) device, in accordance with some demonstrative embodiments.

Reference is made to FIG. 2, which schematically illustrates a sequence of communications exchanged between a host device ("host") 202 and a WSE device 204, in accordance with some demonstrative embodiments. For example, host device 202 may perform the functionality of device 102 (FIG. 1) and/or WSE device may perform the functionality of device 104 (FIG. 1).

In some demonstrative embodiments, host 202 may communicate with WSE device 204 over a wireless communication link, e.g., wireless communication link 103 (FIG. 1). WSE device 204 may allocate to host 202 an initial credit for transferring data to a particular EP, e.g., EP 134 (FIG. 1), via WSE device 204.

In some demonstrative embodiments, host 202 may transmit to WSE device 204 a transfer request 206 including a first data block 210, denoted B1, which has a size equal to or lesser than the initial credit, and indicating a remaining data size to be transferred to the particular EP.

In some demonstrative embodiments, WSE device 204 may determine a credit allocation corresponding to the particular EP based on transfer request 206, the estimated link delay of the wireless communication link, and an estimated delivery rate of delivering data from a buffer of WSE device 204, e.g., buffer 131 (FIG. 1), to the particular endpoint.

In some demonstrative embodiments, WSE device 204 may transmit to host 202 a transfer response 208 including the allocated credit.

In some demonstrative embodiments, host 202 may transmit to WSE device 204 subsequent transfer requests including subsequent data blocks 212, 214, 216 and 218, denoted B2, B3, B4 and B5, respectively, based on additional credit allocated by WSE device 204.

As shown in FIG. 2, in some demonstrative embodiments WSE device 204 may allocate an increasing amount of credit to host 202, e.g., to enable host 202 to transfer an increasing amount of data, e.g., a size of block 218 is greater than a size of block 216, which in turn is greater than a size of block 214, which in turn is greater than a size of block 212, which in turn is greater than a size of block 210.

As shown in FIG. 2, in some demonstrative embodiments WSE device 204 may allocate the credit to host 202 so as to enable host 202 to continuously transmit the data to WSE device 204, e.g., without causing host 202 to halt the delivery of the data due to lack of credit.

Referring back to FIG. 1, in some demonstrative embodiments controller 130 may determine a compensation factor, denoted $EP_i(CF)$, corresponding to a particular EP, denoted $EP_i$, i=0 . . . n−1, wherein n denotes a number of EPs being served. For example, controller 130 may determine the compensation factor $EP_i(CF)$ based on the estimated link delay, denoted $T_D$, of wireless communication link 103, and the estimated delivery rate, denoted $EP_i(R)$, of delivering data from buffer 131 to the endpoint $EP_i$, e.g., as follows:

$$EP_i(CF)=(EP_i(R) \times T_D) \times C \qquad (1)$$

wherein C denotes a predefined factor, e.g., C=1/1000 or any other value.

In some demonstrative embodiments, controller 130 may allocate an initial buffer, denoted $EP_i(M)$, of buffer 131 corresponding to the endpoint $EP_i$. For example, the initial buffer $EP_i(M)$ may be allocated to satisfy the following condition:

$$EP_i(M) \geq \text{Maximum USB Packet size for } EP_i \qquad (2)$$

In some demonstrative embodiments, a remaining number of buffers, denoted N, after the initial allocation of the buffers may be determined based on a total number of buffers in buffer 131, denoted T, and the initial buffers allocated to the n EPs, e.g., as follows:

$$N = T - \sum_{i=0}^{n-1} EP_i(M) \qquad (3)$$

In some demonstrative embodiments controller 130 may allocate credit for a transaction to a particular EP, denoted $EP_j$, wherein $0 \leq j \leq n-1$, based on a weighted average, denoted $EP_j(WA)$, of a remaining data size of the transaction to the endpoint $EP_j$, denoted $EP_j(RS)$, relative to a sum of the remaining data sizes of all active transactions, e.g., as follows:

$$EP_j(WA) = \left\{ EP_j(RS) / \sum_{i=0}^{n-1} EP_i(RS) \right\} \times N \qquad (4)$$

wherein $EP_i(RS)$ denotes a remaining data size of the transaction to the endpoint $EP_i$.

For example, controller 130 may receive the remaining data sizes $EP_i(RS)$ as part of the transfer requests from device 102, e.g., as described above.

In some demonstrative embodiments, controller 130 may determine a non-compensated allowable credit, denoted $EP_j(K)$, to be allocated to the endpoint $EP_j$, for example, based on the weighted average $EP_j(WA)$ and the remaining data size $EP_j(RS)$. For example, controller 130 may determine the non-compensated allowable credit $EP_j(K)$ based on a minimum of the weighted average $EP_j(WA)$ and the remaining data size $EP_j(RS)$, e.g., as follows:

$$EP_j(K)=\text{Minimum}[EP_j(WA),EP_j(RS)] \qquad (5)$$

For example, the non-compensated allowable credit $EP_j(K)$ may be equal to the remaining data size $EP_j(RS)$, which is requested by device 102 for the transaction, e.g., as long as the remaining data size $EP_j(RS)$ is equal to or less than the weighted average $EP_j(WA)$. The non-compensated allowable credit $EP_j(K)$ may be restricted to the weighted average $EP_j(WA)$, e.g., if the remaining data size $EP_j(RS)$ is greater than the weighted average $EP_j(WA)$.

In some demonstrative embodiments, controller 130 may determine a credit allocation, denoted $EP_j(L)$, to be allocated to the endpoint $EP_j$, for example, based on the remaining data size $EP_j(RS)$, the non-compensated allowable credit $EP_j(K)$, and the compensation factor $EP_j(CF)$ corresponding to the endpoint $EP_j$. For example, controller 130 may determine the credit allocation $EP_j(L)$ based on a minimum of the remaining data size $EP_j(RS)$ and a product of the non-compensated allowable credit $EP_j(K)$ and the compensation factor $EP_j(CF)$, e.g., as follows:

$$EP_j(L)=\text{Minimum}\{EP_j(RS), EP_j(K) \times EP_j(CF)\} \qquad (6)$$

For example, the credit allocation $EP_j(L)$ may be equal to the remaining data size $EP_j(RS)$, which is requested by device 102 for the transaction, e.g., as long as the remaining data size $EP_j(RS)$ is equal to or less than the product of the non-compensated allowable credit $EP_j(K)$ and the compensation factor $EP_j(CF)$.

For example, the product of the non-compensated allowable credit $EP_j(K)$ and the compensation factor $EP_j(CF)$ may represent, for example, an adjustment of the allowable credit $EP_j(K)$ compensated with respect to the link delay $T_d$ and the estimated delivery rate to the endpoint $EP_j$.

For example, the credit allocation $EP_j(L)$ may be restricted to the product of the allowable credit $EP_j(K)$ and the compensation factor $EP_j(CF)$, e.g., if the remaining data size $EP_j(RS)$ is greater than the product of the allowable credit $EP_j(K)$ and the compensation factor $EP_j(CF)$.

In some demonstrative embodiments, the product of the non-compensated allowable credit $EP_j(K)$ and the compensation factor $EP_j(CF)$ may be lesser than the data size $EP_j(RS)$, for example, when the data size $EP_j(RS)$ is greater than a free portion of buffer 130. Accordingly, controller 130 may determine the particular credit allocation $EP_j(L)$ based on the compensation factor $EP_j(CF)$, which may be based on the estimated link delay and the estimated delivery rate of $EP_j$, for example, in response to receiving a request message from device 102 indicating the data size $EP_j(RS)$, which is greater than the free portion of buffer 130.

In some demonstrative embodiments, controller 130 may determine the particular credit allocation $EP_j(L)$, e.g., based on the compensation factor $EP_j(CF)$, e.g., when the data size $EP_j(RS)$ is greater than the free portion of buffer 130.

For example, controller 130 may determine the particular credit allocation $EP_j(L)$ to include a first credit allocation, in response to the estimated link delay $T_d$ including a first link delay, and to determine the particular credit allocation $EP_j(L)$ to include a second credit allocation, greater than the first credit allocation, in response to the estimated link delay $T_d$ including a second link delay, greater than the first link delay, e.g., when the data size $EP_j(RS)$ is greater than the free portion of buffer 130.

For example, controller 130 may determine the particular credit allocation $EP_j(L)$ to include a first credit allocation, in response to the estimated delivery rate $EP_j(R)$ including a first delivery rate, and to determine the particular credit allocation $EP_j(L)$ to include a second credit allocation, greater than the first credit allocation, in response to the estimated delivery rate $EP_j(R)$ including a second delivery rate, greater than the first delivery rate, e.g., when the data size $EP_j(RS)$ is greater than the free portion of buffer 130.

In some demonstrative embodiments, controller 130 may dynamically update the allowable credit $EP_j(K)$ and/or the credit allocation $EP_j(L)$, e.g., be reiterating over Equations 4, 5 and/or 6, for example, based on subsequent transfer requests received with respect to the endpoint $EP_j$, transfer requests received with respect to other endpoints, and/or credit allocations $EP_i(L)$ for other endpoints.

Figure 3:
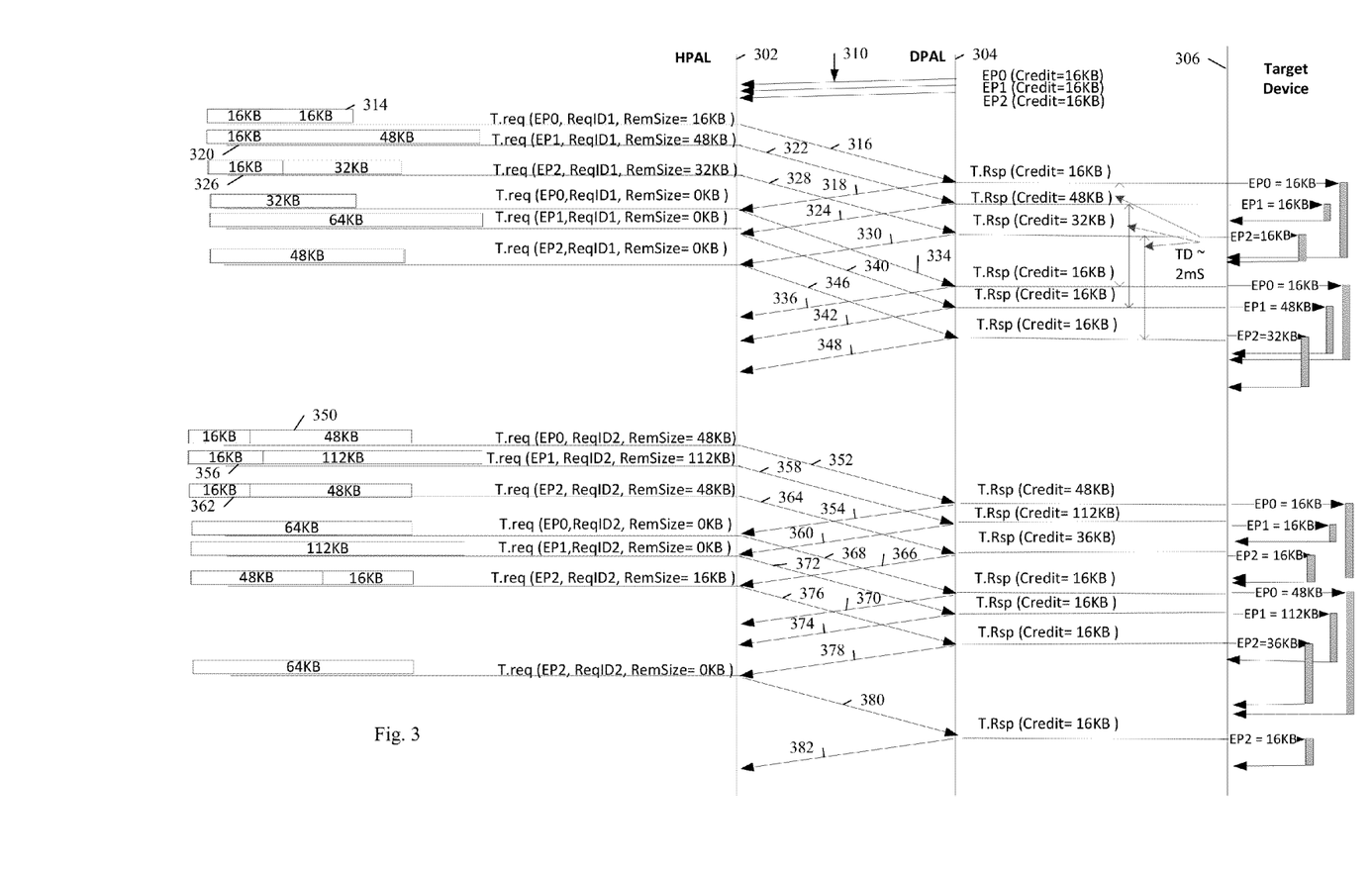
FIG. 3 is a schematic illustration of a sequence of communications between a host device, a WSE device and a plurality of end points (EPs), in accordance with some demonstrative embodiments.

FIG. 3 schematically illustrates a sequence of communications between a host device (HPAL) 302, a WSE device (DPAL) 304 and a plurality of endpoints (target devices) 306, in accordance with some demonstrative embodiments. For example, HPAL 302 may perform the functionality of device 102 (FIG. 1), DPAL 304 may perform the functionality of device 104 (FIG. 1) and/or target devices 306 may perform the functionality of EPs 134, 135, 136, 138 and/or 140 (FIG. 1).

In some demonstrative embodiments, target devices 306 may include a first EP, denoted $EP_0$, a second EP, denoted $EP_1$, and a third EP, denoted $EP_2$.

In some demonstrative embodiments, DPAL 304 may communicate to HPAL 302 a plurality of initial credit allocations 310 corresponding to $EP_0$, $EP_1$, and $EP_2$. For example, DPAL 304 may allocate a credit of 16 Kb to each of $EP_0$, $EP_1$, and $EP_2$.

In some demonstrative embodiments, the total credit allocation may be M=48 Kb, and the remaining buffer size may be N=80 Kb.

In some demonstrative embodiments, HPAL 302 may have data 314 to be transferred to $EP_0$, data 320 to be transferred to $EP_1$, and data 326 to be transferred to $EP_2$. For example, data 314 may have a size of 32 Kb, data 320 may have a size of 64 Kb, and data 326 may have a size of 48 Kb.

In some demonstrative embodiments, HPAL 302 may transmit to DPAL 304 a transfer request 316 including a 16 Kb data block of data 314, and a remaining size field indicating a remaining data size of 16 Kb; a transfer request 322 including a 16 Kb data block of data 320, and a remaining size field indicating a remaining data size of 48 Kb; and a transfer request 328 including a 16 Kb data block of data 326, and a remaining size field indicating a remaining data size of 32 Kb.

In some demonstrative embodiments, DPAL 304 may buffer the received data blocks, e.g., in buffer 131 (FIG. 1), for transferring to $EP_0$, $EP_1$, and $EP_2$.

In some demonstrative embodiments, a controller of DPAL 304, e.g., controller 130 (FIG. 1), may determine the estimated delivery rates $EP_0(R)$, $EP_1(R)$ and $EP_2(R)$ corresponding to $EP_0$, $EP_1$, and $EP_2$, respectively. For example, controller 130 (FIG. 1) may determine $EP_0(R)$=0.5 Gbps, $EP_1(R)$=2 Gbps and $EP_2(R)$=1 Gbps.

In some demonstrative embodiments, DPAL 304 may allocate a credit of 16 Kb to $EP_0$, a credit of 48 Kb to $EP_1$, and a credit of 32 Kb to $EP_2$, e.g., in accordance with the remaining data size indicated by transfer requests 316, 322 and 328. DPAL 304 may transmit to HPAL 302 a transfer response 318 including the credit allocated to $EP_0$, e.g., in response to transfer request 316; a transfer response 324 including the credit allocated to $EP_1$, e.g., in response to transfer request 322; and a transfer response 330 including the credit allocated to $EP_2$, e.g., in response to transfer request 328.

In some demonstrative embodiments, HPAL 302 may transmit to DPAL 304 a transfer request 334 including a subsequent 16 Kb data block of data 314, and a remaining size field indicating a remaining data size of 0 Kb; a transfer request 340 including a subsequent 48 Kb data block of data 320, and a remaining size field indicating a remaining data size of 0 Kb; and a transfer request 346 including a 32 Kb data block of data 326, and a remaining size field indicating a remaining data size of 0 Kb.

In some demonstrative embodiments, DPAL 304 may buffer the received data blocks, e.g., in buffer 131 (FIG. 1), for transferring to $EP_0$, $EP_1$, and $EP_2$.

In some demonstrative embodiments, the controller of DPAL 304, e.g., controller 130 (FIG. 1), may determine the estimated link delay of the wireless communication link between HPAL 302 and DPAL 304. For example, controller 130 (FIG. 1), may determine the estimated link delay of the wireless communication link between HPAL 302 and DPAL 304 based on an average time difference between the transmission of transfer responses 318, 324 and 330 and the reception of transfer requests 334, 340 and 346, respectively. For example, controller 130 (FIG. 1) may determine the time delay $T_d$=2 milliseconds (msec).

In some demonstrative embodiments, the controller of DPAL 304, e.g., controller 130 (FIG. 1), may allocate credit to $EP_0$, $EP_1$, and $EP_2$, e.g., in accordance with Equation 6. For example, controller 130 may allocate the minimal credit of 16 Kb to each of $EP_0$, $EP_1$, and $EP_2$, e.g., since the remaining data size corresponding to each of $EP_0$, $EP_1$, and $EP_2$ is zero.

In some demonstrative embodiments, DPAL 304 may transmit to HPAL 302 a transfer response 336 including the credit allocated to $EP_0$, e.g., in response to transfer request 334; a transfer response 342 including the credit allocated to $EP_1$, e.g., in response to transfer request 340; and a transfer response 348 including the credit allocated to $EP_2$, e.g., in response to transfer request 346.

In some demonstrative embodiments, controller 130 (FIG. 1) may determine the compensation factors corresponding to $EP_0$, $EP_1$, and $EP_2$, e.g., according to Equation 1. For example, controller 130 may determine the compensation factors $EP_0(CF)$=1, $EP_1(CF)$=4, and $EP_2(CF)$=2.

In some demonstrative embodiments, HPAL 302 may have subsequent data 350 to be transferred to $EP_0$, subsequent data 356 to be transferred to $EP_1$, and subsequent data 362 to be transferred to $EP_2$. For example, data 350 may have a size of 64 Kb, data 356 may have a size of 128 Kb, and data 362 may have a size of 64 Kb.

In some demonstrative embodiments, HPAL 302 may transmit to DPAL 304 a transfer request 352 including a 16 Kb data block of data 350, and a remaining size field indicating a remaining data size of 48 Kb; a transfer request 358 including a 16 Kb data block of data 356, and a remaining size field indicating a remaining data size of 112 Kb; and a transfer request 364 including a 16 Kb data block of data 362, and a remaining size field indicating a remaining data size of 48 Kb.

In some demonstrative embodiments, DPAL 304 may buffer the received data blocks, e.g., in buffer 131 (FIG. 1), for transferring to $EP_0$, $EP_1$, and $EP_2$.

In some demonstrative embodiments, the controller of DPAL 304, e.g., controller 130 (FIG. 1), may allocate credit to $EP_0$, $EP_1$, and $EP_2$, e.g., in accordance with Equations 4, 5 and/or 6.

For example, controller 130 (FIG. 1) may determine the values of $EP_0(K)$, $EP_1(K)$, and $EP_2(K)$, e.g., in accordance with Equation 5. For example, controller 130 (FIG. 1) may determine the values $EP_0(K)$=Minimum(80 Kb,48 Kb)=48 Kb; $EP_1(K)$=Minimum(56 Kb,112 Kb)=56 Kb; and $EP_2(K)$=Minimum(18 Kb,48 Kb)=18 Kb.

For example, controller 130 (FIG. 1) may determine the values of $EP_0(L)$, $EP_1(L)$, and $EP_2(L)$, e.g., in accordance with Equation 6. For example, controller 130 (FIG. 1) may determine the values $EP_0(L)$=Minimum(48 Kb,48 Kb)=48 Kb; $EP_1(L)$=Minimum(112 Kb,224 Kb)=112 Kb; and $EP_2(L)$=Minimum(48 Kb,36 Kb)=36 Kb.

In some demonstrative embodiments, DPAL 304 may transmit to HPAL 302 a transfer response 354 including the credit of 48 Kb allocated to $EP_0$, e.g., in response to transfer request 352; a transfer response 360 including the credit of 112 Kb allocated to $EP_1$, e.g., in response to transfer request 358; and a transfer response 366 including the credit of 36 Kb allocated to $EP_2$, e.g., in response to transfer request 364.

In some demonstrative embodiments, HPAL 302 may transmit to DPAL 304 a transfer request 368 including a subsequent 48 Kb data block of data 350, and a remaining size field indicating a remaining data size of 0 Kb; a transfer request 372 including a subsequent 112 Kb data block of data 356, and a remaining size field indicating a remaining data size of 0 Kb; and a transfer request 376 including a 32 Kb data block of data 362, and a remaining size field indicating a remaining data size of 16 Kb.

In some demonstrative embodiments, DPAL 304 may buffer the received data blocks, e.g., in buffer 131 (FIG. 1), for transferring to $EP_0$, $EP_1$, and $EP_2$.

In some demonstrative embodiments, the controller of DPAL 304, e.g., controller 130 (FIG. 1), may allocate credit to $EP_0$, $EP_1$, and $EP_2$, e.g., in accordance with Equation 6. For example, controller 130 may allocate the minimal credit of 16 Kb to each of $EP_0$ and $EP_1$, e.g., since the remaining data size corresponding to each of $EP_0$ and $EP_1$ is zero; and a credit of 16 Kb to $EP_2$, e.g., in accordance with transfer request 376.

In some demonstrative embodiments, DPAL 304 may transmit to HPAL 302 a transfer response 370 including the credit allocated to $EP_0$, e.g., in response to transfer request 368; a transfer response 374 including the credit allocated to $EP_1$, e.g., in response to transfer request 372; and a transfer response 378 including the credit allocated to $EP_2$, e.g., in response to transfer request 376.

In some demonstrative embodiments, HPAL 302 may transmit to DPAL 304 a transfer request 380 including a subsequent 16 Kb data block of data 362, and a remaining size field indicating a remaining data size of 0 Kb.

In some demonstrative embodiments, the controller of DPAL 304, e.g., controller 130 (FIG. 1), may allocate credit to $EP_2$, e.g., in accordance with Equation 6. For example, controller 130 may allocate the minimal credit of 16 Kb to $EP_2$, e.g., since the remaining data size corresponding to each of $EP_2$ is zero. DPAL 304 may transmit to HPAL 302 a transfer response 382 including the credit allocated to $EP_2$, e.g., in response to transfer request 380.

Figure 4:
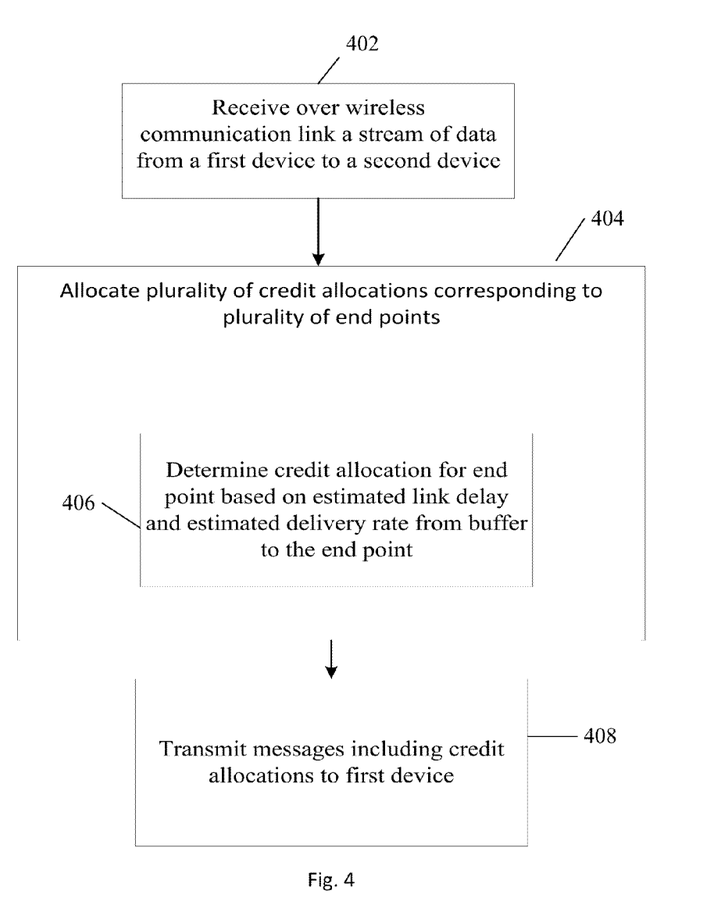
FIG. 4 is a schematic flow-chart illustration of a method of controlling data flow over a wireless communication link with credit allocation, in accordance with some demonstrative embodiments.

Reference is made to FIG. 4, which schematically illustrates a method of controlling data flow over a wireless communication link with credit allocation, in accordance with some demonstrative embodiments. In some embodiments, one or more of the operations of the method of FIG. 4 may be performed by a wireless communication system e.g., system 100 (FIG. 1); a wireless communication device, e.g., devices 102 and/or 104 (FIG. 1); and/or a controller, e.g., controller 130 (FIG. 1).

As indicated at block 402, the method may include receiving a stream of data from a first device at a second device over a wireless communication link, the stream of data including data to be delivered to a plurality of endpoints. For example, device 104 (FIG. 1) may receive from device 102 (FIG. 1) over wireless communication link 103 (FIG. 1) a stream of data including data to be delivered to EPs 134, 135, 136, 138 and/or 140 (FIG. 1), e.g., as described above.

As indicated at block 404, the method may include allocating, at the second device, a plurality of credit allocations corresponding to the plurality of endpoints.

As indicated at block 406, the allocating may include determining a particular credit allocation corresponding to a particular end point based at least on an estimated link delay of the wireless communication link, and an estimated delivery rate of delivering data from a buffer of the second device to the particular endpoint. For example, controller 130 (FIG. 1) may determine a particular credit allocation corresponding to a particular end point of EPs 134, 135, 136, 138 and/or 140 (FIG. 1) based at least on an estimated link delay of wireless communication link 103 (FIG. 1), and an estimated delivery rate of delivering data from buffer 131 (FIG. 1) to the particular endpoint, e.g., as described above.

As indicated at block 408, the method may include transmitting from the second device to the first device one or more messages including the plurality of credit allocations. For example, device 104 (FIG. 1) may transmit to device 102 (FIG. 1) a plurality of transfer response messages including credit allocated for endpoints 134, 135, 136, 138 and/or 140 (FIG. 1), e.g., as described above.

Figure 5:
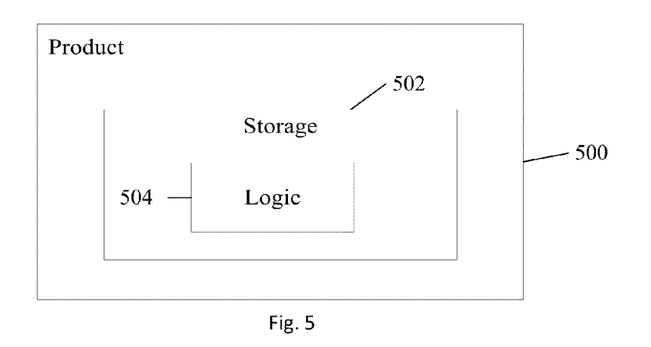
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1) and/or controller 130 (FIG. 1) and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising:
a controller to control a data flow of a stream of data from a first device to a second device over a wireless communication link, the stream of data including data to be delivered to a plurality of endpoints, said controller is to provide to said first device a plurality of credit allocations corresponding to said plurality of endpoints, said controller is to determine a credit allocation corresponding to an endpoint, based at least on an estimated link delay of said wireless communication link and an estimated delivery rate of delivering data from a buffer of said second device to said endpoint, wherein said controller is to determine said credit allocation based on said estimated link delay and said estimated delivery rate, in response to receipt of a request message from said first device at said second device, the request message indicating a data size of data for said endpoint to be transmitted over said wireless communication link, said data size is greater than a free portion of said buffer.

2. The apparatus of claim 1, wherein said controller is to determine said credit allocation to be a first credit allocation, when said estimated link delay is a first link delay, and to determine said credit allocation to be a second credit allocation, greater than said first credit allocation, when said estimated link delay is a second link delay, greater than said first link delay.

3. An apparatus comprising:
a controller to control a data flow of a stream of data from a first device to a second device over a wireless communication link, the stream of data including data to be delivered to a plurality of endpoints, said controller is to provide to said first device a plurality of credit allocations corresponding to said plurality of endpoints, said controller is to determine a credit allocation corresponding to an endpoint, based at least on an estimated link delay of said wireless communication link, an estimated delivery rate of delivering data from a buffer of said second device to said endpoint, and remaining sizes of data for one or more other endpoints to be transmitted over said wireless communication link.

4. The apparatus of claim 3, wherein said controller is to determine said credit allocation to be a first credit allocation, when said estimated link delay is a first link delay, and to determine said credit allocation to be a second credit allocation, greater than said first credit allocation, when said estimated link delay is a second link delay, greater than said first link delay.

5. The apparatus of claim 3, wherein said controller is to determine said credit allocation to be a first credit allocation, when said estimated delivery rate is a first delivery rate, and to determine said credit allocation to be a second credit allocation, greater than said first credit allocation, when said estimated delivery rate is a second delivery rate, greater than said first delivery rate.

6. The apparatus of claim 3, wherein said controller is to determine said estimated link delay based on a time at which said credit allocation is communicated to said first device, and a time of receipt at said second device of data utilizing said credit allocation.

7. The apparatus of claim 3, wherein said controller is to determine said credit allocation based on a relationship between a remaining size of data for said endpoint to be transmitted over said wireless communication link, and a sum of said remaining sizes.

8. The apparatus of claim 3, wherein said wireless communication link comprises a wireless gigabit (WiGig) link.

9. The apparatus of claim 8, wherein said WiGig link comprises a WiGig Serial Extension (WSE) link.

10. A system comprising:
a device comprising:
one or more antennas;
a radio to receive, via said one or more antennas, a data flow of a stream of data from a host over a wireless communication link, the stream of data including data to be delivered to a plurality of endpoints; and
a controller to control said data flow by providing to said host a plurality of credit allocations corresponding to said plurality of endpoints, said controller is to determine a credit allocation corresponding to an endpoint, based at least on an estimated link delay of said wireless communication link, and an estimated delivery rate of delivering data from a buffer of said device to said endpoint,
wherein said radio is to receive from said host a transfer request indicating a remaining data size of data for said endpoint to be transferred over said wireless communication link, said controller is to determine said credit allocation based on said remaining data size, and said radio is to transmit to said host a transfer response including said credit allocation.

11. The system of claim 10, wherein said controller is to determine said credit allocation to be a first credit allocation, when said estimated link delay is a first link delay, and to determine said credit allocation to be a second credit allocation, greater than said first credit allocation, when said estimated link delay is a second link delay, greater than said first link delay.

12. The system of claim 10, wherein said controller is to determine said credit allocation to be a first credit allocation, when said estimated delivery rate is a first delivery rate, and to determine said credit allocation to be a second credit allocation, greater than said first credit allocation, when said estimated delivery rate is a second delivery rate, greater than said first delivery rate.

13. The system of claim 10, wherein said controller is to determine said estimated link delay based on a time at which said credit allocation is communicated to said host, and a time of receipt at said radio of data utilizing said credit allocation.

14. The system of claim 10, wherein said wireless communication link comprises a wireless gigabit (WiGig) link.

15. The system of claim 14, wherein said WiGig link comprises a WiGig Serial Extension (WSE) link.

16. The system of claim 10, wherein said plurality of endpoints comprise one or more Universal-Serial-Bus (USB) devices.

17. A system comprising:
a device comprising:
one or more antennas;
a radio to receive, via said one or more antennas, a data flow of a stream of data from a host over a wireless communication link, the stream of data including data to be delivered to a plurality of endpoints; and a controller to control said data flow by providing to said host a plurality of credit allocations corresponding to said plurality of endpoints, said controller is to determine a credit allocation corresponding to an endpoint, based at least on an estimated link delay of said wireless communication link, and an estimated delivery rate of delivering data from a buffer of said device to said endpoint, wherein said controller is to determine said credit allocation based on said estimated link delay and said estimated delivery rate, in response to receipt of a request message from said host, the request message indicating a data size of data for said endpoint to be transmitted over said wireless communication link, said data size is greater than a free portion of said buffer.

18. The system of claim 17, wherein said controller is to determine said credit allocation to be a first credit allocation, when said estimated delivery rate is a first delivery rate, and to determine said credit allocation to be a second credit allocation, greater than said first credit allocation, when said estimated delivery rate is a second delivery rate, greater than said first delivery rate.

19. A system comprising:
a device comprising:
one or more antennas;
a radio to receive, via said one or more antennas, a data flow of a stream of data from a host over a wireless communication link, the stream of data including data to be delivered to a plurality of endpoints; and
a controller to control said data flow by providing to said host a plurality of credit allocations corresponding to said plurality of endpoints, said controller is to determine a credit allocation corresponding to an endpoint, based at least on an estimated link delay of said wireless communication link, an estimated delivery rate of delivering data from a buffer of said device to said endpoint, and remaining sizes of data for one or more other endpoints to be transmitted over said wireless communication link.

20. The system of claim 19, wherein said controller is to determine said credit allocation based on a relationship between a remaining size of data for said endpoint to be transmitted over said wireless communication link and a sum of said remaining sizes.

21. A method comprising:
receiving a stream of data from a first device at a second device over a wireless communication link, the stream of data including data to be delivered to a plurality of endpoints;
allocating, at said second device, a plurality of credit allocations corresponding to said plurality of endpoints, said allocating comprises determining a credit allocation corresponding to an endpoint, in response to receiving at said second device a request message from said first device, the request message indicating a data size of data for said endpoint to be transmitted over said wireless communication link, said data size is greater than a free portion of a buffer of said second device, wherein determining the credit allocation corresponding to said endpoint comprises determining the credit allocation based at least on an estimated link delay of said wireless communication link, and an estimated delivery rate of delivering data from the buffer of said second device to said endpoint; and
transmitting from said second device to said first device one or more messages including said plurality of credit allocations.

22. The method of claim 21 comprising determining said credit allocation to be a first credit allocation, when said estimated link delay is a first link delay, and determining said credit allocation to be a second credit allocation, greater than said first credit allocation, when said estimated link delay is a second link delay, greater than said first link delay.

23. The method of claim 21 comprising determining said credit allocation to be a first credit allocation, when said estimated delivery rate is a first delivery rate, and determining said credit allocation to be a second credit allocation, greater than said first credit allocation, when said estimated delivery rate is a second delivery rate, greater than said first delivery rate.

24. The method of claim 21 comprising determining said estimated link delay based on a time at which said credit allocation is communicated from said second device to said first device, and a time of receipt at said second device of data utilizing said credit allocation.

25. A method comprising:
receiving a stream of data from a first device at a second device over a wireless communication link, the stream of data including data to be delivered to a plurality of endpoints;
allocating, at said second device, a plurality of credit allocations corresponding to said plurality of endpoints, said allocating comprises determining a credit allocation corresponding to an endpoint based at least on an estimated link delay of said wireless communication link, an estimated delivery rate of delivering data from a buffer of said second device to said endpoint, and remaining sizes of data for one or more other endpoints to be transmitted over said wireless communication link; and
transmitting from said second device to said first device one or more messages including said plurality of credit allocations.

26. The method of claim 25 comprising determining said credit allocation to be a first credit allocation, when said estimated link delay is a first link delay, and determining said credit allocation to be a second credit allocation, greater than said first credit allocation, when said estimated link delay is a second link delay, greater than said first link delay.

27. A product including a non-transitory storage medium having stored thereon instructions that, when executed by a machine, result in:
receiving a stream of data from a first device at a second device over a wireless communication link, the stream of data including data to be delivered to a plurality of endpoints;
allocating, at said second device, a plurality of credit allocations corresponding to said plurality of endpoints, said allocating comprises determining a credit allocation corresponding to an endpoint, in response to receiving at said second device a request message from said first device, the request message indicating a data size of data for said endpoint to be transmitted over said wireless communication link, said data size is greater than a free portion of a buffer of said second device, wherein determining the credit allocation corresponding to said endpoint comprises determining the credit allocation based at least on an estimated link delay of said wireless communication link, and an estimated delivery rate of delivering data from the buffer of said second device to said endpoint; and transmitting from said second device to said first device one or more messages including said plurality of credit allocations.

28. The product of claim 27, wherein said instructions result in determining said estimated link delay based on a time at which said credit allocation is communicated to said first device, and a time of receipt at said second device of data utilizing said credit allocation.

29. The product of claim 27, wherein said instructions result in determining said credit allocation to be a first credit allocation, when said estimated link delay is a first link delay, and determining said credit allocation to be a second credit allocation, greater than said first credit allocation, when said estimated link delay is a second link delay, greater than said first link delay.

30. The product of claim 27, wherein said instructions result in determining said credit allocation to be a first credit allocation, when said estimated delivery rate is a first delivery rate, and determining said credit allocation to be a second credit allocation, greater than said first credit allocation, when said estimated delivery rate is a second delivery rate, greater than said first delivery rate.

\* \* \* \* \*